United States Patent [19]

Bos

[11] 4,195,760
[45] Apr. 1, 1980

[54] APPARATUS FOR SLOTTING METAL SHAPES

[75] Inventor: Andre Bos, Toulouse, France

[73] Assignee: Technal International S.A., France

[21] Appl. No.: 776,178

[22] Filed: Mar. 10, 1977

[30] Foreign Application Priority Data

Mar. 11, 1976 [FR] France ............................... 76 07416

[51] Int. Cl.² .............................................. B26F 3/00
[52] U.S. Cl. .................................... 225/103; 81/3 R; 225/93
[58] Field of Search .................... 225/103, 93, 1, 2; 81/3 R, 3.46 R; 29/278, 268, 267

[56] References Cited

U.S. PATENT DOCUMENTS

| | | | |
|---|---|---|---|
| 1,029,578 | 6/1912 | Ferrall et al. | 81/3 R |
| 1,162,815 | 12/1915 | Spangler | 225/103 |
| 2,659,950 | 11/1953 | West | 225/93 X |
| 2,719,358 | 10/1955 | Lassen | 81/3 R X |
| 2,990,734 | 7/1961 | Jackson | 81/3 R |
| 3,579,797 | 5/1971 | Pepe | 29/267 |
| 3,713,200 | 1/1973 | Burns | 225/103 X |
| 4,034,595 | 7/1977 | Smith | 29/267 X |

*Primary Examiner*—Frank T. Yost
*Attorney, Agent, or Firm*—Robert E. Burns; Emmanuel J. Lobato; Bruce L. Adams

[57] ABSTRACT

The present invention relates to a nipper for slotting metal shapes of light alloy.

4 Claims, 7 Drawing Figures

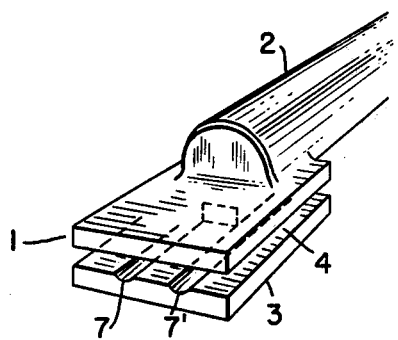
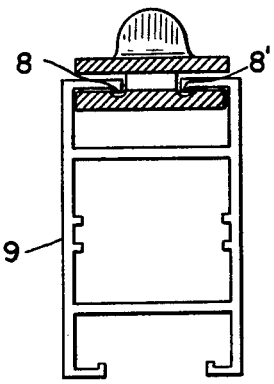
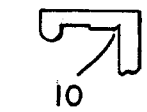
FIG. 1  FIG. 2  FIG. 3A
FIG. 3B
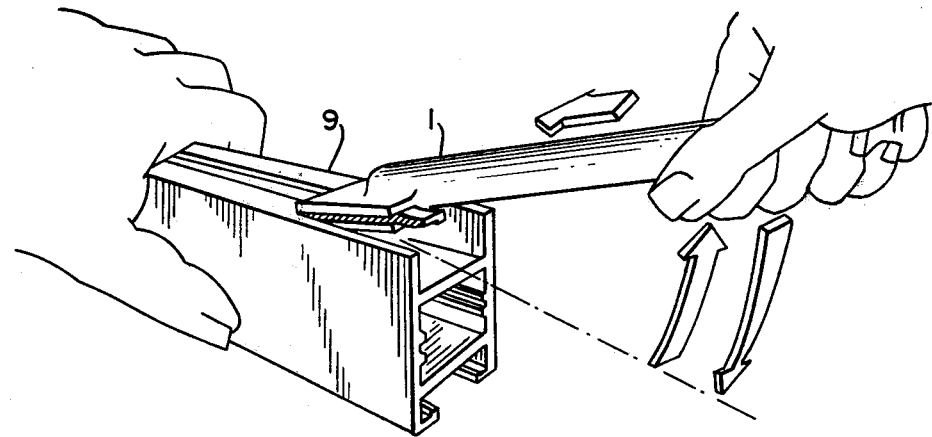
FIG. 4
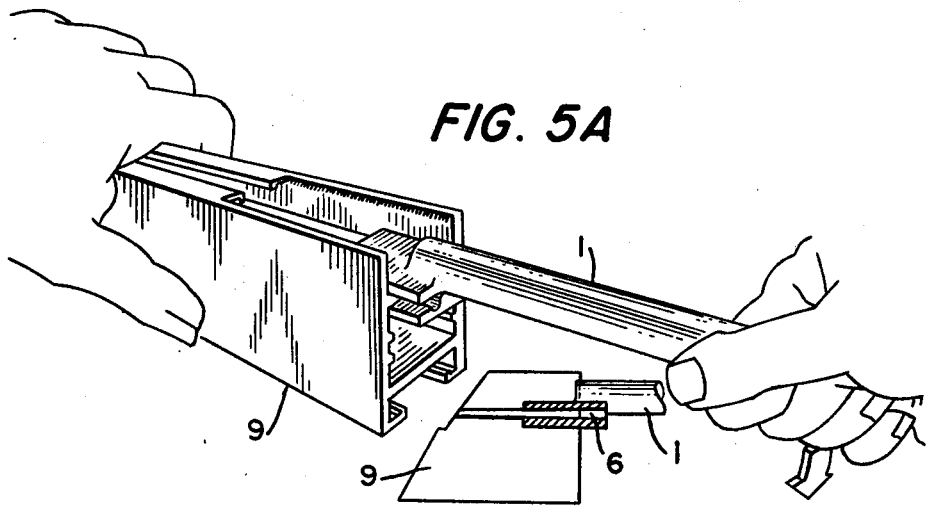
FIG. 5A
FIG. 5B

APPARATUS FOR SLOTTING METAL SHAPES

When it is desired to produce grooves in light alloy shapes, for instance of aluminum, in order to produce frames, particularly door frames, there are at present employed milling and stamping methods which require complicated tooling and are therefore expensive.

The process in accordance with the present invention makes it possible to avoid these drawbacks. In this method there is employed the principle of shearing employing a single nipper which is extremely simple to manufacture and therefore of very low cost.

The nipper in accordance with the invention comprises a handle forming a lever which is provided at its end with a head having a groove the width of which is at least equal to that of the thickness of the metal which it is to shear. On both sides of the said head there are provided two notches which permit the emergence of the metal which it is desired to eliminate.

The principle of use is extremely simple; the portion of the metal which it is desired to remove is inserted into the corresponding groove of the nipper and one proceeds by shearing up to the place desired.

The following description read with reference to the accompanying drawings will make it possible better to understand the purposes, characteristics, and advantages of the invention.

In the drawing,

FIG. 1 is a front view of the nipper which forms the object of the invention.

FIG. 2 is a sectional view through a type of metal shape which it is desired to slot and of the nipper forming the object of the invention, shown in operating position.

FIGS. 3A and 3B are sectional views through a shape having scribed marks.

FIGS. 4, 5A and 5B show the nipper in accordance with the invention in working position.

FIGS. 1, 2 and 4 show the nipper 1 provided with a handle 2 and a head 3. This head 3 has a groove 4 of a width at least equal to that of the thickness of the metal shape which it is desired to shear.

On both sides of the head 3 there is arranged a notch 6 adapted to permit the emergence of the metal which it is desired to eliminate (FIG. 5).

This same head 3 has two grooves 7 and 7' adapted to facilitate the cutting of shapes having return portions such as 8 and 8'.

In FIG. 3 it is seen that the shapes to be cut, which create an incipient break have a scribing mark such as 10 which will make it possible to shear the said shape very accurately up to the place desired.

In FIGS. 4 and 5, one can clearly note the use of the nipper 1; the user inserts the portion of the metal shape 9 which he desires to slot into the groove 4 of the nipper and then by an upward and downward movement he shears the metal up to the place desired, the scribing marks previously produced in the shape making it possible to shear the shape very accurately up to the desired point.

The process which forms the object of the invention can be used in all cases in which it is desired to produce notches or slots in metal shapes of light alloy in order to produce structures such as door frames or the like.

Of course, the present invention is not limited to the foregoing specific description but covers all variants and improvements within the scope of the man skilled in the art.

I claim:

1. A nipper for slotting shapes comprising, a handle, a head mounted on said handle having a transverse slot open at a leading end of said head and terminating at a trailing end of said head as two laterally spaced extensions of said transverse slot, said head comprising two spaced plate portions defining said slot for receiving therein a section of a shape of metal to be sheared by reciprocable movement of said handle relative to a plane passing through said section.

2. A nipper for slotting shapes according to claim 1, in which said nipper plate each have a straight leading edge effective for shearing said section of the form received in said slot when said handle is actuated reciprocably on either side of said plane.

3. A nipper for slotting shapes according to claim 1, in which said plates constitute an upper and a lower plate defining therebetween said slot about the width of the thickness of the material of said section, and in which said lower plate comprises two laterally spaced grooves extending generally in the direction in which said handle extends.

4. A nipper for slotting shapes according to claim 3, in which said grooves are spaced laterally and dimensioned for receiving therein laterally spaced ribs on the section of the shape to be notched.